(12) United States Patent
Komatsubara et al.

(10) Patent No.: US 12,373,544 B2
(45) Date of Patent: Jul. 29, 2025

(54) INFORMATION PROCESSING APPARATUS, IMAGE FORMATION APPARATUS, AND INFORMATION PROCESSING METHOD

(71) Applicant: TOSHIBA TEC KABUSHIKI KAISHA, Tokyo (JP)

(72) Inventors: Yoshihiro Komatsubara, Mishima Shizuoka (JP); Yasuhiro Inagaki, Mishima Shizuoka (JP); Fumihiko Ikegami, Kawasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 316 days.

(21) Appl. No.: 17/965,190

(22) Filed: Oct. 13, 2022

(65) Prior Publication Data

US 2023/0252128 A1 Aug. 10, 2023

(30) Foreign Application Priority Data

Feb. 4, 2022 (JP) ................................. 2022-016532

(51) Int. Cl.
*G06F 21/51* (2013.01)
*H04L 9/40* (2022.01)

(52) U.S. Cl.
CPC ............ *G06F 21/51* (2013.01); *H04L 63/101* (2013.01)

(58) Field of Classification Search
CPC .............................. H04L 63/101; G06F 21/51
See application file for complete search history.

(56) References Cited

U.S. PATENT DOCUMENTS

| | | | | |
|---|---|---|---|---|
| 2013/0198507 A1* | 8/2013 | Kasuya | ..................... | G06F 8/65 713/100 |
| 2020/0401688 A1* | 12/2020 | Michishita | .............. | G06F 21/57 |
| 2022/0021788 A1* | 1/2022 | Kawazu | ............... | H04N 1/4433 |

FOREIGN PATENT DOCUMENTS

JP 2009-259160 A 11/2009

* cited by examiner

*Primary Examiner* — Carl G Colin
*Assistant Examiner* — Phillip Emmanuel Wilson
(74) *Attorney, Agent, or Firm* — Kim & Stewart LLP (57) ABSTRACT

According to an embodiment, an information processing apparatus performs, in a case where an information processing program specified as an activation target is not an information processing program allowed in advance to be executed and included in a white list, execution restriction of the specified information processing program. Moreover, the information processing apparatus stops the execution restriction in accordance with a determination that the specified information processing program is an information processing program for forced stop.

8 Claims, 4 Drawing Sheets

INFORMATION PROCESSING APPARATUS, IMAGE FORMATION APPARATUS, AND INFORMATION PROCESSING METHOD

CROSS-REFERENCE TO RELATED APPLICATION

This application is based upon and claims the benefit of priority from the prior Japanese Patent Application No. 2022-016532, filed on Feb. 4, 2022, the entire contents of which are incorporated herein by reference.

FIELD

An embodiment described here generally relates to an information processing apparatus, an image formation apparatus, and an information processing method.

BACKGROUND

As for an information processing apparatus capable of installing an information processing program arbitrarily and executing the installed information processing program, there is known a technology of preparing a white list that is a list of information processing programs allowed to be executed and rejecting an execution request for information processing programs not included in this list. However, there is a fear that information processing programs originally allowed to be executed cannot be executed if the white list is broken in application of such a technology. In view of such circumstances, it is desirable to temporarily stop a function of restricting activation of information processing programs on the basis of a white list.

DETAILED DESCRIPTION

In accordance with one embodiment, an information processing apparatus includes a storage device, an input device, and a processor. The storage device stores a white list. The white list is a list of a plurality of information processing programs allowed in advance to be executed. The input device inputs an activation request for an information processing program. The processor performs, in a case where an information processing program specified as an activation target by the activation request input via the input device is not an information processing program included in the white list stored in the storage device, execution restriction of the specified information processing program. The processor determines whether the specified information processing program is an information processing program for forced stop on the basis of predetermined information regarding the specified information processing program. In addition, the processor stops the execution restriction in accordance with a determination that the specified information processing program is the information processing program for forced stop.

Hereinafter, an example of an embodiment will be described with reference to the drawings. In the drawings, the same reference signs denote the same or similar portions. It should be noted that in this embodiment, a multifunction peripheral (MFP) configured to inherently have an information processing apparatus for function control will be described as an example. An MFP 1 is an apparatus having image formation-related functions such as a printing function and a copy function as main functions. The MFP 1 is a type of image formation apparatus.

Figure 1:
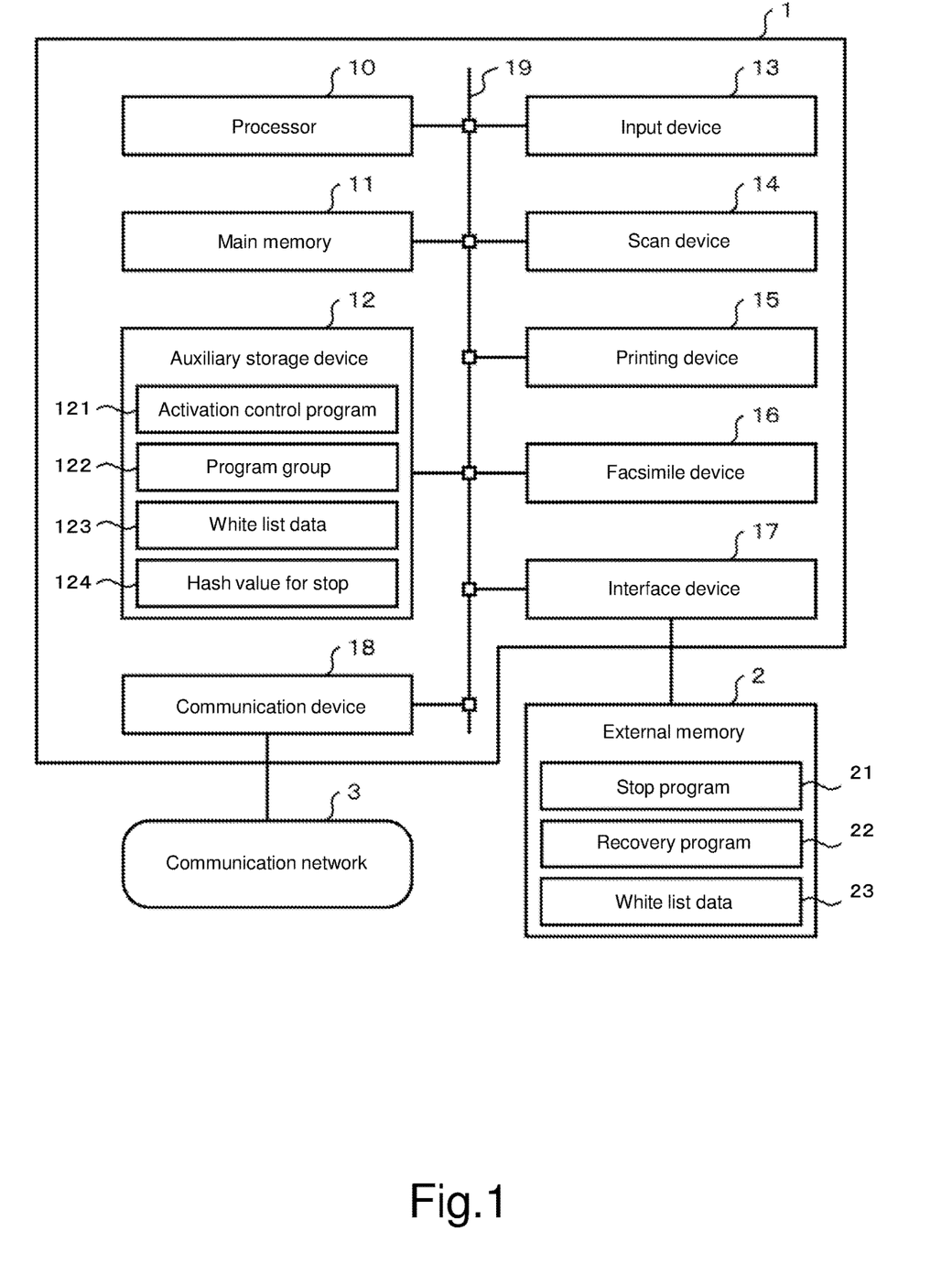
FIG. 1 is a block diagram showing circuit configurations of main parts of an MFP according to an embodiment.

FIG. 1 is a block diagram showing circuit configurations of main parts of the MFP 1 according to this embodiment. The MFP 1 has a processor 10, a main memory 11, an auxiliary storage device 12, and an input device 13. Moreover, the MFP 1 has a scan device 14, a printing device 15, and a facsimile device 16 as a plurality of devices for image formation. In addition, the MFP 1 has an interface device 17, a communication device 18, and a transmission channel 19, for example. The processor 10, the main memory 11, the auxiliary storage device 12, the input device 13, the scan device 14, the printing device 15, the facsimile device 16, the interface device 17, and the communication device 18 are connected via the transmission channel 19.

A computer that performs information processing for controlling the MFP 1 is configured by connecting the processor 10, the main memory 11, and the auxiliary storage device 12 via the transmission channel 19. The processor 10 corresponds to a central part of the above-mentioned computer. In accordance with an information processing program such as an operating system and an application program, the processor 10 performs information processing for controlling each part in order to realize various functions as the MFP 1.

The main memory 11 corresponds to a main storage part of the above-mentioned computer. The main memory 11 includes a read-only memory area and a rewritable memory area. The main memory 11 stores a part of the above-mentioned information processing program in the read-only memory area. Moreover, the main memory 11 can store data required for the processor 10 to perform the processing for controlling each part in the read-only memory area or the rewritable memory area. The rewritable memory area of the main memory 11 is used as a work area for the processor 10.

Figure 2:
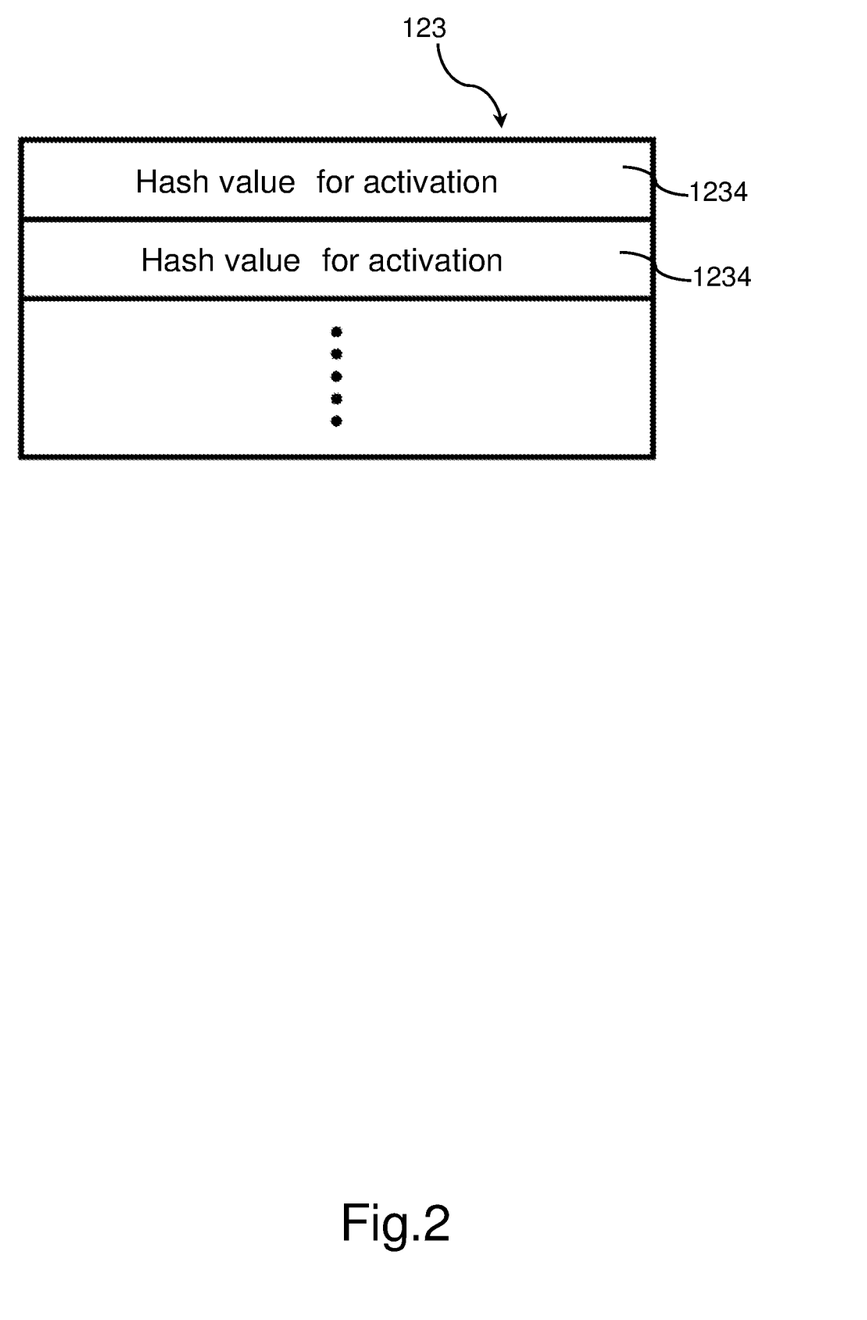
FIG. 2 is a diagram showing an example of a white list according to the embodiment.

The auxiliary storage device 12 corresponds to an auxiliary storage portion of the above-mentioned computer. The auxiliary storage device 12 includes, for example, an electric erasable programmable read-only memory (EEPROM), a hard disc drive (HDD), a solid-state drive (SSD), and other well-known various storage devices. The auxiliary storage device 12 stores data used for the processor 10 to perform various types of processing and data generated by the processing at the processor 10. The auxiliary storage device 12 can store the above-mentioned information processing program. The auxiliary storage device 12 in this embodiment stores an activation control program 121 that is one of information processing programs. Moreover, the auxiliary storage device 12 in this embodiment stores a program group 122 including one or more information processing programs. A part of the storage area of the auxiliary storage device 12 is used as an area for storing a white list data 123 and a hash value for stop 124. The white list data 123 is data representing a white list. The white list (the white list data representing the white list 123) is, as shown in FIG. 2, a list representing each of hash values 1234 (hereinafter, referred to as hash values for activation 1234) regarding a plurality of information processing programs (hereinafter, referred to as normal programs) allowed to be executed at the MFP 1.

The hash value for stop 124 is a hash value regarding a stop program to be described later.

Which information processing program is allowed to be executed at the MFP 1 is determined by, for example, a manufacturer of the MFP 1. Then, for example, in the manufacture process of the MFP 1, the white list data 123 is written in the auxiliary storage device 12. For example, a hash value for activation 1234 regarding a normal program is determined by adding a whole part of such a normal program as an argument to a predetermined hash function. It should be noted that only a predetermined part of the one information processing program may be the argument. The hash value for stop 124 is determined by adding a whole part of the stop program to be described later as an argument to a predetermined hash function. It should be noted that only a predetermined part of the stop program may be the argument. A well-known one, for example, message digest algorithm 5 (MD5) can be employed as the hash function. The hash function for calculating the hash value for activation 1234 and the hash function for calculating the hash value for stop 124 may be the same or may be different.

The white list data 123 may be generated in accordance with circumferences of the user of the MFP 1. That is, for example, in addition to information processing programs determined to be allowed to be executed by the manufacturer of the MFP 1, the white list data 123 representing the white list including information processing programs additionally determined to be allowed by the user's wish may be written in the auxiliary storage device 12. In this case, for example, during installation work for starting the use of the MFP 1, a serviceman or the like may write the white list data 123 in the auxiliary storage device 12. The hash value for activation 1234 may be stored in the read-only memory area of the main memory 11.

The input device 13 is an operation and display device that inputs an operation made by an operator and performs display for presenting various types of information to the operator. The input device 13 can include various operation devices and display devices such as a touch panel, a keyboard, a key switch, an LED lamp, and a liquid-crystal display panel as appropriate. The operator is often the user of the MFP 1. However, a serviceman who performs maintenance of the MFP 1 can be the operator.

The scan device 14 scans a document and generates image data of an image expressed in the document.

The printing device 15 prints the image indicated by the image data to a recording sheet. The printing device 15 includes a well-known printing device, for example, an electrophotographic image formation device. The facsimile device 16 performs well-known various types of processing for performing image communication compatible with the facsimile standards via a communication network (not shown) such as a public switched telephone network (PSTN).

The interface device 17 has a port that is removably mounted on an external memory 2. The interface device 17 is an interface for exchanging data with the external memory 2 when the external memory 2 is mounted on the port. For example, a ready-made device compatible with the existing standards such as universal serial bus (USB) standards can be used as the interface device 17. The communication device 18 performs communication processing for data communication via a communication network 3. For example, the existing communication device such as a local area network (LAN) can be used as the communication device 18. The transmission channel 19 includes an address bus, a data bus, a control signal line, and the like and transmits data and control signals exchanged between the connected parts.

The external memory 2 is a USB memory for example. The external memory 2 stores each of a stop program 21, a recovery program 22, and white list data 23. The external memory 2 is mountable on the port of the interface device 17. When the external memory 2 is mounted on the port, the external memory 2 outputs the stop program 21, the recovery program 22, and the white list data 23 to an interface unit 17 in accordance with a request from the processor 10. The stop program 21 and the recovery program 22 are information processing programs representing a procedure of information processing of the processor 10. The white list data 23 is data representing the white list like the white list data 123 stored in the auxiliary storage device 12. As the communication network 3, the Internet, a virtual private network (VPN), an LAN, a public communication network, a movable object communication network, and the like can be used alone or in combination as necessary. Herein, the LAN is used as the communication network 3 as an example.

Next, an operation of the MFP 1 configured as described above will be described. It should be noted that the contents of processes to be described below are exemplary, and for example some of the processes can be changed in order or omitted and other processes can be added as necessary.

In the MFP 1, the processor 10 controls operations of parts of the MFP 1, for example, the scan device 14, the printing device 15, and the facsimile device 16 in order to realize a printing function, a copy function, a scan function, a facsimile function, and the like in a similar manner to that performed at the same type of existing MFP. Such control is realized by the processor 10 performing information processing based on the information processing program included in the program group 122. By the processor 10 performing the information processing based on the information processing program included in the program group 122 in this manner, the computer having the processor 10 as the central part functions as a processing means. It should be noted that the description of details of the information processing based on the information processing program included in the program group 122 will be omitted. Hereinafter, control processing related to activation of the information processing based on the information processing programs included in the program group 122 stored in the auxiliary storage device 12 or the stop program 21 and the recovery program 22 in stored in the external memory 2 will be described.

Figure 3:
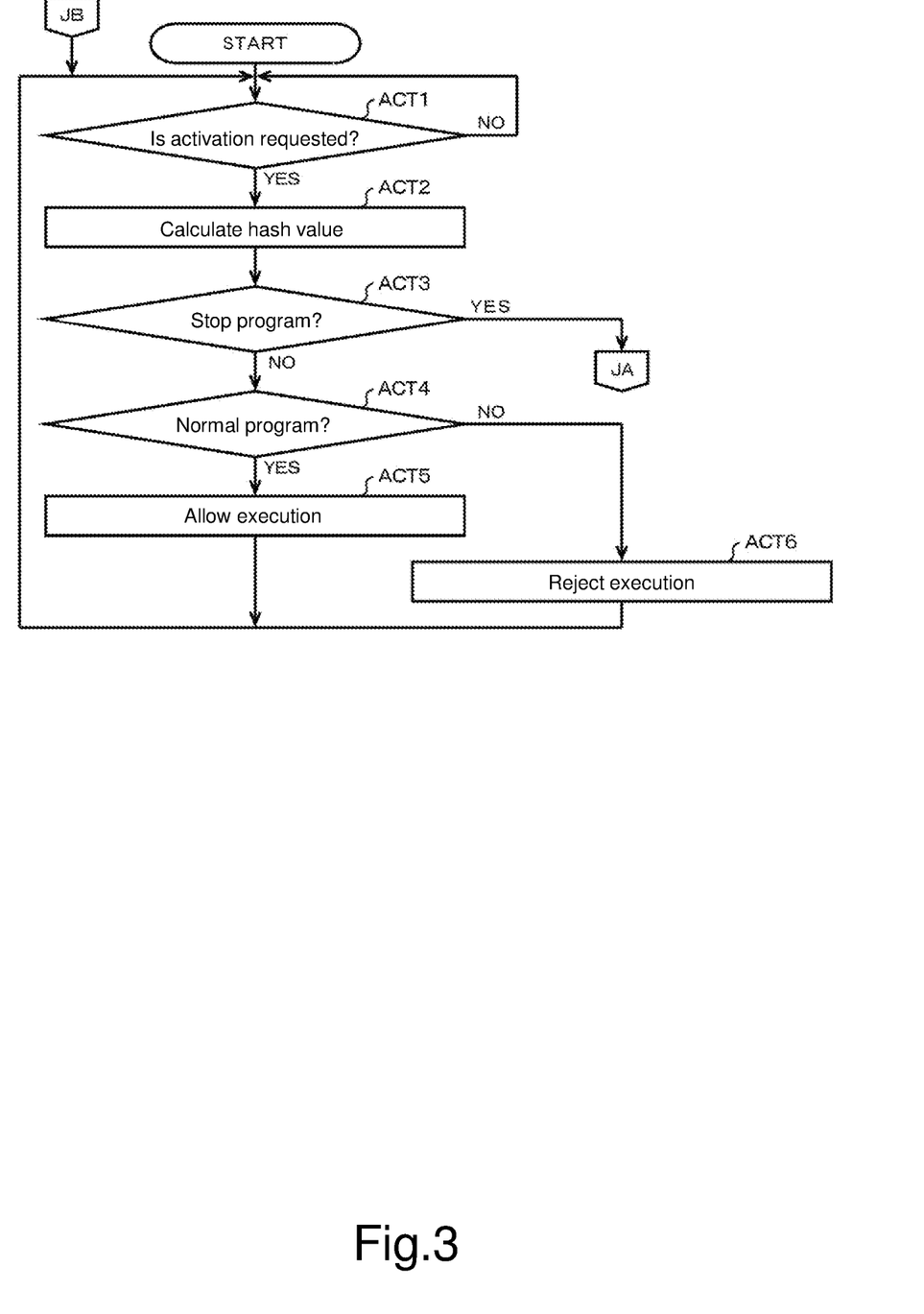
FIG. 3 is a flowchart showing an activation control processing according to the embodiment.
Figure 4:
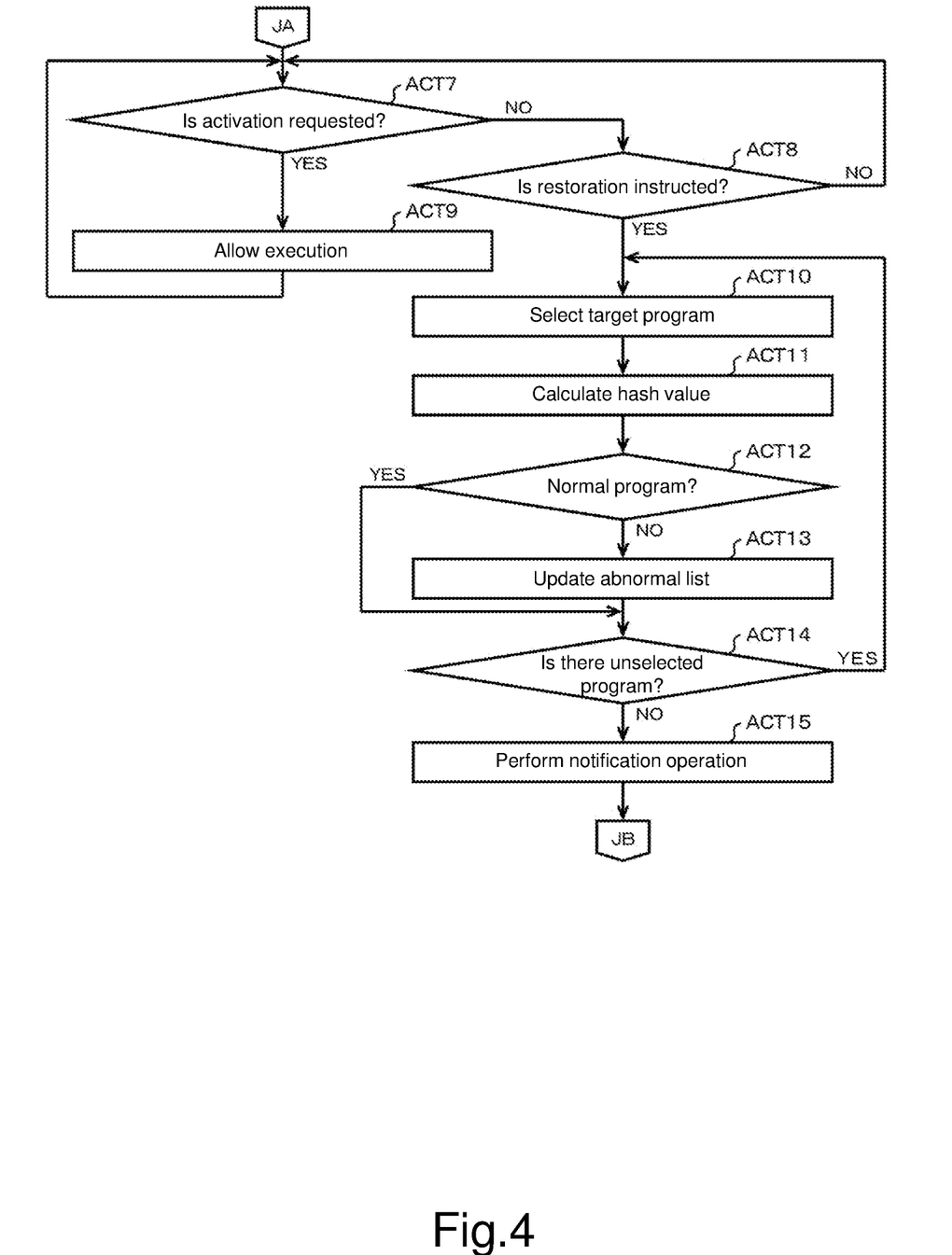
FIG. 4 is a flowchart showing the activation control processing according to the embodiment.

When the MFP 1 is running, the processor 10 performs information processing based on the activation control program 121 (hereinafter, referred to as activation control processing). The activation control processing is favorably performed as a resident process. FIGS. 3 and 4 are flowcharts showing the activation control processing. In ACT1 of FIG. 3, the processor 10 determines whether or not activation of information processing programs has been requested, thereby waiting for the activation of information processing programs to be requested. Then, in a case where it is determined that the activation of information processing programs has been requested (YES in ACT1), the processing of the processor 10 proceeds to ACT2. It should be noted that for example, the function "Linux Security Modules" can be used for this determination. It should be noted that "Linux" is a registered trademark.

In ACT2, the processor 10 calculates a hash value regarding an information processing program specified as an activation target (hereinafter, referred to as specified program) in accordance with the above-mentioned request. The processor 10 adds a whole part of the specified program included in the program group 122 stored in the auxiliary storage device 12 or the external memory 2 as an argument to the same hash function as the one used for calculating the hash value for activation 1234 and the hash value for stop 124 for example, thereby calculating a hash value regarding the specified program. It should be noted that when different hash functions have been used for calculating the hash value for activation 1234 and the hash value for stop 124, the processor 10 uses the hash function, which has been used for calculating the hash value for stop 124, for calculating the hash value regarding the specified program in a case where the specified program is the stop program 21 for example. Moreover, the processor 10 uses the hash function, which has been used for calculating the hash value for activation 1234, for calculating the hash value regarding the specified program in a case where the specified program is other than the stop program 21, for example. Moreover, for calculating the hash value for activation 1234 and the hash value for stop 124, in a case where a part of the information processing program is used as the argument, the processor 10 uses the same portion of the specified program stored in the auxiliary storage device 12 or the external memory 2 as the argument.

In ACT3, the processor 10 determines whether or not the specified program is the stop program. The processor 10 checks whether or not the hash value calculated in the processing of ACT2 is identical to the hash value for stop 124, for example. Then, in a case where the calculated hash value is identical to the hash value for stop 124, the processor 10 determines that the specified program is the stop program. Moreover, in a case where the calculated hash value is not identical to the hash value for stop 124, the processor 10 determines that the specified program is not the stop program. Then, in a case where it is determined that the specified program is not the stop program (NO in ACT3), the processing of the processor 10 proceeds to ACT4. In ACT4, the processor 10 determines whether or not the specified program is a normal program. The processor 10 checks whether or not the hash value calculated in the processing of ACT2 is identical to the hash value for activation 1234 for example.

For example, when execution of a certain function is requested by an operation made by the user through the input device 13, activation of the information processing based on the information processing program described as to the information processing for realizing that function is requested. At this time, in a case where such an information processing program stored in the auxiliary storage device 12 is the normal program, the hash value calculated in the processing of ACT2 is identical to the hash value for activation 1234. Then, in such a case, the processor 10 determines that the specified program is the normal program. In a case where it is determined that the specified program is the normal program (YES in ACT4), the processing of the processor 10 proceeds to ACT5. In ACT5, the processor 10 allows execution of the specified program. Accordingly, the processor 10 starts information processing based on the specified program as processing of a thread different from that of the activation control processing. Then, in the activation control processing, the processing of the processor 10 returns to the standby mode of ACT1.

It should be noted that in a case where the specified program is written in the auxiliary storage device 12 illegally or a case where illegal replacement or alteration or the like is done, the hash value calculated in ACT2 is not identical to the hash value for activation 1234. In such a case, the processor 10 determines that the specified program is not the normal program. In a case where it is determined that the specified program is not the normal program (NO in ACT4), the processing of the processor 10 proceeds to ACT6. It should be noted that if the white list data 123 stored in the auxiliary storage device 12 has been broken and the hash value for activation 1234 regarding the specified program has changed even in a case where the specified program is the normal program, the processor 10 determines that the specified program is not the normal program (NO in ACT4). In ACT6, the processor 10 rejects the execution of the specified program. In this case, the processor 10 does not start the information processing based on the specified program. Then, in the activation control processing, the processing of the processor 10 returns to the standby mode of ACT1. In this manner, by the processor 10 performing the information processing based on the activation control program 121 stored in the auxiliary storage device 12, the computer having the processor 10 as the central part functions as an execution restriction means. At this time, the processor 10 may perform a predetermined warning operation of, for example, displaying on the input device 13 a screen for notifying the user of the fact that the specified program cannot be activated.

By the way, for example, in a case where the white list data 123 stored in the auxiliary storage device 12 has been broken, a serviceman in charge of maintenance of the MFP 1 mounts the special external memory 2 prepared in advance for work therefor on the port of the interface device 17. This special external memory 2 is, for example, a USB memory storing the stop program 21. Then, the serviceman instructs execution of the stop program 21 stored in the external memory 2 via the input device 13. In accordance with this instruction, in a case where activation of the stop program 21 is requested and the stop program 21 stored in the external memory 2 is a normal stop program, the hash value calculated in the processing of ACT2 is identical to the hash value for stop 124. Then, in such a case, the processor 10 determines that the specified program is the stop program 21. In a case where it is determined that the specified program is the stop program (YES in ACT3), the processing of the processor 10 proceeds to ACT7 of FIG. 4. In this manner, the processor 10 performs information processing based on the activation control program 121 stored in the auxiliary storage device 12. Accordingly, the computer having the processor 10 as the central part functions as a checking means that checks that the specified program is the stop program 21 as the information processing program for forced stop.

In ACT7, the processor 10 determines whether or not activation of information processing programs has been requested as in the processing of ACT1. Then, in a case where it is determined that the activation of information processing programs has not been requested (NO in ACT7), the processing of the processor 10 proceeds to ACT8. In ACT8, the processor 10 determines whether or not a restoration instruction to be described later has been made. Then, in a case where it is determined that the restoration instruction has not been made (determined as NO in ACT8 when such an event cannot be checked), the processing of the processor 10 returns to ACT7. In this manner, the processor 10 waits for the activation request or the restoration instruction in ACT7 and ACT8.

Then, in a case where it is determined that the activation of information processing programs has been requested (YES in ACT7), the processing of the processor 10 proceeds to ACT9. In ACT9, the processor 10 allows execution of the specified program. Accordingly, the processor 10 starts information processing based on the specified program as processing of a thread different from that of the activation control processing. Then, the processing of the processor 10 returns to the standby mode of ACT7 and ACT8 in the activation control processing.

In this manner, as for the activation request generated in the standby mode of ACT7 and ACT8, the processor 10 allows execution of the specified program without a check based on the white list. That is, the processor 10 stops the check function based on the white list represented by the white list data 123 after the execution of the stop program 21 is requested while the external memory 2 storing the normal stop program 21 is mounted. In this manner, by the processor 10 performing the information processing based on the activation control program 121 stored in the auxiliary storage device 12, the computer having the processor 10 as the central part functions as a stop means.

In this manner, the serviceman can activate the information processing based on the information processing program required for maintenance without being affected by a broken white list data 123 stored in the auxiliary storage device 12. For example, the serviceman instructs execution of the recovery program 22 stored in the external memory 2 via the input device 13. Accordingly, the processor 10 starts information processing based on the recovery program 22 at ACT9. Then, the processor 10 performs predetermined recovery processing, e.g., writing in the auxiliary storage device 12 the white list data 23 stored in the external memory 2 for example as the white list data 123 in the information processing based on the recovery program 22. The recovery of the white list data 123 stored in the auxiliary storage device 12 may be realized by the information processing of the processor 10 based on the information processing programs included in the program group 122 or the operating system, for example, in accordance with the serviceman's instruction. Moreover, arbitrary maintenance processing other than the recovery of the white list data 123 stored in the auxiliary storage device 12 may be performed as appropriate. The serviceman instructs restoration of a predetermined operation at the input device 13 for example after the serviceman finishes necessary maintenance work. Alternatively, restoration instruction may be made with respect to the activation control processing by the information processing of the processor 10 based on the recovery program 22 stored in the external memory 2.

Then, in a case where it is determined that restoration is instructed in this manner (YES in ACT8), the processing of the processor 10 proceeds to ACT10. In ACT10, the processor 10 selects one of information processing programs regarding the information processing, which is being executed as the processing of the thread different from that of the activation control processing, as an information processing program as a target to be checked (hereinafter, referred to as target program).

In ACT11, the processor 10 calculates a hash value regarding the target program. The processor 10 calculates the hash value by adding a whole part of the target program stored in the auxiliary storage device 12 or the external memory 2 as an argument to the same hash function as the one used for calculating the hash value for activation 1234 for example. It should be noted that in a case where a part of the information processing program has been used as the argument for calculating the hash value for activation 1234, the processor 10 uses the same portion of the target program stored in the auxiliary storage device 12 or the external memory 2 as the argument.

In ACT12, the processor 10 determines whether or not the target program is the normal program. The processor 10 checks whether or not the hash value calculated at the processing of ACT11 for example is identical to the hash value for activation 1234. In a case where the target program is not the normal program represented in the white list, the hash value calculated at the processing of ACT11 is not identical to the hash value for activation 1234. Then, in a case where both the hash values are not identical to the hash value for activation 1234, the processor 10 determines that the target program is not the normal program. In a case where it is determined that the target program is not the normal program (NO in ACT12), the processing of the processor 10 proceeds to ACT13.

In ACT13, the processor 10 updates an abnormal list. The abnormal list is a list of information processing programs whose execution is abnormal (hereinafter, referred to as abnormal programs). For example, in a case where the processing of ACT13 is performed for the first time, the processor 10 generates abnormal list data representing an abnormal list including the target program as an abnormal program and stores the abnormal list data in the main memory 11 or the auxiliary storage device 12. Moreover, for example, in a case where the processing of ACT13 has already been performed, the processor 10 updates the abnormal list data stored in the main memory 11 or the auxiliary storage device 12 so as to represent the abnormal list including the current target program as the abnormal program. In this manner, at this time, the processor 10 detects that the information processing program under execution is not any information processing program included in the white list so as to be allowed to be executed. That is, by the processor 10 performing the information processing based on the activation control program 121, the computer having the processor 10 as the central part functions as a detection means.

After the update of the abnormal list at ACT13 is finished, the processing of the processor 10 proceeds to ACT14. It should be noted that in a case where the hash value calculated at the processing of ACT11 is identical to the hash value for activation 1234, the processor 10 determines that the target program is the normal program. In a case where it is determined that the target program is the normal program (YES in ACT12), the processing of the processor 10 skips ACT13 and proceeds to ACT14.

In ACT14, the processor 10 determines whether or not there is an information processing program unselected as the target program. Then, in a case where it is determined that there is an information processing program unselected as the target program (YES in ACT14), the processing of the processor 10 repeats the processing in ACT10 and following ACT10. It should be noted that in a case where the processor 10 performs the processing of ACT10 from the second time, the processor 10 sets, as a target program, an information processing program different from those already selected in the loop of the processing of ACT10 to ACT14. Moreover, in a case where there is an information processing program that is an information processing program under execution in the processing of ACT14 and is not selected as the target program in the loop of the processing of ACT10 to ACT14, the processor 10 determines that there is an information processing program unselected as the target program (YES in ACT14). In this manner, the processor 10 checks whether or not each of information processing programs under execution is the normal program, and adds information processing programs as abnormal programs to the abnormal list in a case where they are not normal programs. Then, the processor 10 determines that there is no information processing program unselected as the target program in a case where all the information processing programs under execution have been selected as target programs. In a case where it is determined that there is no information processing program unselected as the target program (NO in ACT14), the processing of the processor 10 proceeds to ACT15.

In ACT15, the processor 10 performs a notification operation for notifying the serviceman of the check result of ACT10 to ACT14. The processor 10 displays a check result screen on the input device 13 for example. The check result screen is a screen showing whether each of the information processing programs under execution includes an abnormal program. Specifically, what type of screen is used as the check result screen may be determined as appropriate by a designer or the like of the MFP 1 for example. A screen showing a list of abnormal programs included in the abnormal list is assumed as an example of the check result screen. Moreover, a screen showing that illegal the program is under execution is assumed as an example of the check screen in a case where the abnormal list is generated. It should be noted that the notification operation may be performed by any other method, e.g., printing a result sheet representing a check result through the printing device 15 or sending notification information to an arbitrary notification destination terminal via the communication network 3 from the communication device 18. Then, the processing of the processor 10 returns to the standby mode of ACT1 of FIG. 3.

It should be noted that in a case where a predetermined display termination condition is satisfied, the processor 10 terminates display of the check result screen. A case where it is performed by the predetermined input device 13 for instructing display termination of the check result screen is assumed as an example of the display termination condition. A case where an elapse time from a time when the check result screen is displayed becomes a predetermined time is assumed as an example of the display termination condition. The processor 10 may return to the standby mode of ACT1 with the check result screen displayed or may return to the standby mode of ACT1 after the display of the check result screen is terminated.

When the serviceman has confirmed that the abnormal program is being performed on the basis of the check result screen, the serviceman carries out execution stop, uninstall, or another measure as appropriate for such an information processing program. It should be noted that the processor 10 may perform processing for stopping execution of the target program before or after the processing of ACT13 for example. Moreover, in a case where it is determined that the target program is not the normal program (NO in ACT12), the processor 10 receives an operation of specifying whether or not to stop execution of the target program. Then, in a case where a determination to stop the execution of the target program is made, the processor 10 performs the processing of stopping the execution of the target program. In addition, the processing of the processor 10 proceeds to ACT13 or ACT14. Otherwise, in a case where a determination not to stop the execution of the target program is made, the processing of the processor 10 may proceed to ACT14 without performing such processing.

As described above, in a case where the information processing program requested to be executed is not the information processing program in advance allowed to be executed, the MFP 1 performs execution restriction of such an information processing program. However, in a case where it has been confirmed that the information processing program requested to be executed is the stop program 21 stored in the external memory 2, the MFP 1 stops the above-mentioned execution restriction. In this manner, the function of restricting the activation of information processing programs on the basis of the white list represented by the white list data 123 can be temporarily stopped. Then, since the execution request for the stop program 21 stored in the external memory 2 becomes the stop request of the execution restriction, those who do not know that can be prevented from stopping the execution restriction.

It should be noted that as in the above-mentioned embodiment, the MFP 1 executes the stop program 21 stored in the external memory 2 without storing the stop program 21 in the auxiliary storage device 12. Accordingly, even if the storage contents of the auxiliary storage device 12 are analyzed, it is difficult to know the presence of the stop program 21, so it is possible to prevent illegally stopping the execution restriction by using the stop program 21.

Moreover, in a case where the hash value calculated by using a whole part of the information processing program requested to be executed as the argument is identical to the hash value calculated in advance by using a whole part of the stop program 21 as the argument, the MFP 1 determines that the execution of the stop program 21 has been requested. In this manner, in a case where the information processing program requested to be executed is completely identical to the stop program 21, the execution restriction is not stopped. In addition, those who do not have the normal stop program 21 cannot stop the execution restriction by operation. It should be noted that also in a case where a part of the stop program 21 is used for calculating the hash value, it is difficult to stop the execution restriction unless an illegal program completely identical to such a part can be prepared. Therefore, those who do not have the normal stop program 21 can be prevented from stopping the execution restriction by operation. Moreover, since the data size of the argument is smaller as compared to the case where the whole part of the information processing program is used as the argument, the time required for calculating the hash function can be shortened.

Moreover, in a case of recovering the mode on which the execution control is performed from the mode on which the execution restriction is stopped, the MFP 1 checks whether the information processing program not allowed to be executed is performed. Thus, in a case where the execution of the information processing program not allowed to be executed has been started during the stop of the execution restriction, such a situation can be detected. Then, notifying of such a situation, the MFP 1 enables the serviceman to recognize such a situation and carry out a measure for overcoming such a situation.

The following various modifications can be made in this embodiment. The stop program 21 may be stored in the auxiliary storage device 12. Alternatively, a storage device different from the main memory 11 and the auxiliary storage device 12 may be provided in the MFP 1 and the stop program 21 may be stored in such a storage device.

Whether the information processing program requested to be executed is the normal program or stop program may be checked by a method different from the method using the hash value. For example, on the basis of the fact that a file path of the information processing program requested to be executed is identical to a file path registered in the white list, the processor 10 may determine that it is the normal program. In this case, the load on the processing of the processor 10 can be reduced as compared to the above-mentioned embodiment.

For example, by the information processing of the processor 10 based on the information processing program other than the activation control program 121 such as the stop program 21, the execution restriction may be stopped by stopping the activation control processing. In this case, the processor 10 for example stops the activation control processing on the basis of its process identifier (ID). Such a process ID can be acquired by, for example, using "ps" of the Linux command. Moreover, the process can be stopped by, for example, using "kill" of the Linux command.

The processing of ACT10 to ACT15 may be omitted.

Also as for information processing for controlling functions of an image formation apparatus in another form of the MFP 1, processing similar to the above-mentioned embodiment can be performed.

Also various information processing apparatuses that perform information processing different from the information processing for controlling the functions of the image formation apparatus are capable of performing processing similar to that of the above-mentioned embodiment.

The information processing based on the recovery program 22 can also be realized as the information processing based on the stop program 21.

Some or all of the functions realized by the processor 10 in the information processing can also be realized by hardware that performs information processing not based on a program, such as a logic circuit. Moreover, each of the above-mentioned functions can also be realized by combining the hardware such as the logic circuit with software control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a storage device that stores: i) a plurality of information processing programs allowed in advance to be executed; ii) a white list, the white list being a list of a plurality of predetermined values that are unique to the plurality of information processing programs, respectively; and iii) a predetermined value unique to an information processing program for forced stop of an execution restriction function based on the white list;
an interface device connectable to an external memory;
an input device that inputs an activation request for an information processing program; and
a processor configured to:
determine whether the information processing program specified as an activation target by the activation request input via the input device is not any of the plurality of information processing programs based on the unique values included in the white list;
perform, in a case where the specified information processing program is not any of the plurality of information processing programs, the execution restriction function for the specified information processing program;
determine whether an information processing program requested to be executed is stored in the external memory connected to the interface device, and is the information processing program for forced stop of the execution restriction function based on the predetermined value unique to the information processing program for forced stop of the execution restriction function, stored in the storage device; and
stop the execution restriction function based on the white list in response to a determination that the information processing program requested to be executed is stored in the external memory and is the information processing program for forced stop of the execution restriction function.

2. The information processing apparatus according to claim 1, wherein
the processor
determines a hash value regarding the information processing program requested to be executed, and
determines that the information processing program requested to be executed is the information processing program for forced stop of the execution restriction function on a basis of that the determined hash value is identical to the predetermined value unique to the information processing program for forced stop of the execution restriction function, stored in the storage device.

3. The information processing apparatus according to claim 2, wherein
the processor determines the hash value regarding the information processing program requested to be executed by adding at least a part of the information processing program requested to be executed as an argument to a predetermined hash function.

4. The information processing apparatus according to claim 2, wherein
the processor determines hash value regarding the information processing program requested to be executed by adding a whole part of the information processing program requested to be executed as an argument to a predetermined hash function.

5. The information processing apparatus according to claim 1, wherein
the processor further detects that an information processing program under execution is not any of the information processing programs of which predetermined values are included in the white list in a case where the processor terminates the stop of the execution restriction function and restarts the execution restriction function.

6. The information processing apparatus according to claim 1, wherein the information processing program for forced stop of the execution restriction function is not stored in the information processing apparatus.

7. An image formation apparatus that includes a plurality of devices for image formation and controls operations of the plurality of devices for executing a plurality of functions for image formation, comprising:
a storage device that stores: i) a plurality of information processing programs for controlling operations of the plurality of devices; ii) a white list, the white list being a list of a plurality of predetermined values that are unique to the of the plurality of information processing programs, respectively; and iii) a predetermined value unique to an information processing program for forced stop of an execution restriction function based on the white list;
an interface device connectable to an external memory;

an input device that inputs an activation request for an information processing program; and a processor that controls the operations of the plurality of devices by executing the plurality of information processing programs, the processor being configured to:

determine whether the information processing program specified as an activation target by the activation request input via the input device is not any of the plurality of information processing programs based on the unique values included in the white list;

perform, in a case where the specified information processing program is not any of the plurality of information processing programs, the execution restriction function to reject execution of the specified information processing program;

determine whether an information processing program requested to be executed is stored in the external memory connected to the interface device, and is the information processing program for forced stop of the execution restriction function based on the predetermined value unique to the information processing program for forced stop of the execution restriction function, stored in the storage device; and stop the execution restriction function based on the white list in response to a determination that the information processing program requested to be executed is stored in the external memory and is the information processing program for forced stop of the execution restriction function.

8. An information processing method, comprising:

storing in a storage device: i) a plurality of information processing programs allowed in advance to be executed; ii) a white list, the white list data including a list of a plurality of predetermined values that are unique to the plurality of information processing programs, respectively; and iii) a predetermined value unique to an information processing program for forced stop of an execution restriction function based on the white list;

determining whether an information processing program specified as an activation target by an activation request input via an input device is not any of the plurality of information processing programs based on the unique values included in the white list;

performing, in a case where the specified information processing program is not any of the plurality of information processing programs, the execution restriction function for the specified information processing program;

determining whether an information processing program requested to be executed is stored in an external memory connected to an interface device and is the information processing program for forced stop of the execution restriction function based on the predetermine value unique to the information processing program for forced stop of the execution restriction function, stored in the storage device; and stopping the execution restriction function based on the white list in accordance with a determination that the information processing program requested to be executed is stored in the external memory and is the information processing program for forced stop of the execution restriction function.

* * * * *